(12) United States Patent
Hassan

(10) Patent No.: US 8,995,151 B2
(45) Date of Patent: Mar. 31, 2015

(54) POWER ELECTRONIC CONVERTER

(75) Inventor: Fainan Ahmed Abdul Magueed Mohammed Hassan, Lichield (GB)

(73) Assignee: Alstom Technology Ltd, Baden (CH)

( * ) Notice: Subject to any disclaimer, the term of this patent is extended or adjusted under 35 U.S.C. 154(b) by 47 days.

(21) Appl. No.: 13/983,300

(22) PCT Filed: Feb. 3, 2011

(86) PCT No.: PCT/EP2011/051587
§ 371 (c)(1),
(2), (4) Date: Oct. 2, 2013

(87) PCT Pub. No.: WO2012/103951
PCT Pub. Date: Aug. 9, 2012

(65) Prior Publication Data
US 2014/0362618 A1 Dec. 11, 2014

(51) Int. Cl.
*H02J 3/36* (2006.01)
*G05F 1/70* (2006.01)
*H02J 3/18* (2006.01)

(52) U.S. Cl.
CPC .... *H02J 3/36* (2013.01); *H02J 3/18* (2013.01)
USPC .............................................. 363/35; 323/207

(58) Field of Classification Search
USPC ........... 363/35, 39, 40, 65; 323/205, 207–211
See application file for complete search history.

(56) References Cited

U.S. PATENT DOCUMENTS

| 5,798,631 | A * | 8/1998 | Spee et al. ........................ 322/25 |
| 7,091,703 | B2 * | 8/2006 | Folts et al. ..................... 323/207 |
| 8,837,176 | B2 * | 9/2014 | Trainer et al. .................... 363/44 |
| 8,854,843 | B2 * | 10/2014 | Trainer et al. .................... 363/35 |
| 8,861,231 | B2 * | 10/2014 | Cross et al. ...................... 363/35 |
| 8,867,242 | B2 * | 10/2014 | Clare et al. ...................... 363/35 |
| 8,879,291 | B2 * | 11/2014 | Trainer et al. ................. 363/127 |
| 2012/0267955 | A1 * | 10/2012 | Zhan et al. ........................ 307/31 |
| 2013/0208514 | A1 * | 8/2013 | Trainer et al. .................... 363/35 |
| 2014/0146582 | A1 * | 5/2014 | Gupta et al. ..................... 363/35 |
| 2014/0306543 | A1 * | 10/2014 | Garrity et al. ................... 307/82 |
| 2014/0307494 | A1 * | 10/2014 | Wu et al. ......................... 363/97 |

OTHER PUBLICATIONS

Li, Y.W. et al., "A Grid-Interfacing Power Quality Compensator for Three-Phase Three-Wire Micro-Grid Applications", Power Electronics Specialists Conference 2004, PESC 04; 2004 IEEE 35th Annual, AACHEN, Germany Jun. 20-25, 2004, Piscataway, NJ, USA, IEEE, US, vol. 3, pp. 2011-2017 (Jun. 20, 2004).

(Continued)

*Primary Examiner* — Adolf Berhane
(74) *Attorney, Agent, or Firm* — Nixon Peabody LLP

(57) ABSTRACT

A power electronic converter for high/medium voltage direct current power transmission and reactive power compensation comprises a primary converter unit and an auxiliary converter unit, the primary converter unit including at least one primary converter limb including first and second DC terminals for connection in use to a DC network and an AC terminal, the or each primary converter limb defining first and second limb portions, each limb portion including at least one primary module, the or each primary module including at least one primary switching element connected to an energy storage device, the auxiliary converter unit including at least one auxiliary converter limb including at least one auxiliary module including a plurality of auxiliary switching elements connected to the energy storage device of a corresponding primary module in the first limb portion of a respective primary converter limb, the primary switching elements of the primary modules being controllable in use to switch the respective energy storage device in and out of circuit to generate a voltage waveform at the respective AC terminal.

17 Claims, 4 Drawing Sheets

(56) References Cited

OTHER PUBLICATIONS

Fang Zheng Peng et al., "A New Approach to Harmonic Compensation in Power Systems—A Combined System of Shunt Passive and Series Active Filters", IEEE Transactions on Industry Applications, IEEE Service Center, Piscataway, NJ, US, vol. 26, No. 6, pp. 983-990 (Nov. 1, 1990).
International Search Report and Written Opinion of the International Searching Authority, PCT/EP2011/051587, dated Sep. 27, 2012.

* cited by examiner

POWER ELECTRONIC CONVERTER

CROSS REFERENCE TO RELATED APPLICATIONS or PRIORITY CLAIM

This application is a National Phase of PCT/EP2011/051587, filed Feb. 3, 2011, entitled, "POWER ELECTRONIC CONVERTER", the contents of which are incorporated herein by reference in their entirety.

TECHNICAL FIELD AND PRIOR ART

This invention relates to a power electronic converter for high/medium voltage direct current power transmission and reactive power compensation.

Power changes in a power grid may occur as a consequence of, for example, grid disturbances or line faults, or as a result of "smart" power grids dynamically responding to consumer demand by effectively changing the grid operating conditions. In addition, the connection of grid-connected renewable resources, such as wind parks and solar farms, to the power grid via DC to AC voltage source converters can lead to the introduction of unwanted power changes. These power changes may lead to grid instability and thereby affect the quality of the transmitted power in the power grid, which has economic implications for the power supplier and the end user.

A solution for controlling power quality is a unified power flow controller (UPFC), which is capable of regulating the quality of the transmitted power in the power grid to achieve grid stability.

One conventional arrangement of a UPFC is implemented using two voltage source converters connected via a DC-link bus in a back-to-back configuration. In other conventional UPFC arrangements, the DC link bus is further connected to an additional DC power source, such as an array of photovoltaic panels or a DC micro-grid.

However, the addition of a UPFC to the power transmission scheme, together with the additional DC power sources, requires the size of the associated power station footprint to be increased in order to accommodate the installation of the UPFC, which in turn adds to installation costs.

PRESENTATION OF THE INVENTION

According to an aspect of the invention, there is provided a power electronic converter for high voltage direct current power transmission and reactive power compensation comprising a primary converter unit and an auxiliary converter unit, the primary converter unit including at least one primary converter limb including first and second DC terminals for connection in use to a DC network and an AC terminal, the or each primary converter limb defining first and second limb portions, each limb portion including at least one primary module connected in series between a respective one of the first and second DC terminals and the AC terminal, the or each primary module including at least one primary switching element connected to an energy storage device, the or each primary converter limb further including a first transformer winding connected in series with the respective AC terminal for connection in use between the respective AC terminal and an AC network; the auxiliary converter unit including at least one auxiliary converter limb including first and second auxiliary terminals, the or each auxiliary converter limb further including at least one auxiliary module connected in series with a second transformer winding between the first and second auxiliary terminals, the or each auxiliary module including a plurality of auxiliary switching elements connected to the energy storage device of a corresponding primary module in the first limb portion of a respective primary converter limb, the second transformer winding of the or each auxiliary converter limb being mutually coupled with the first transformer winding of the respective primary converter limb, the primary switching elements of the primary modules being controllable in use to switch the respective energy storage device in and out of circuit to generate a voltage waveform at the respective AC terminal.

For the purpose of this specification, the term "UPQC" is intended to refer to an apparatus that can be used to perform UPFC functions, Universal Power Quality Controller (UPQC) functions or a combination of both.

The provision of primary and auxiliary converter units in a power electronic converter allows the power electronic converter to not only carry out power conversion between the AC and DC networks, but also control the flow of power between the power electronic converter and the AC network in a similar manner to a UPQC. This not only improves the stability of the connected AC network, and thereby results in the reliable transmission of high quality power in the power grid, but also enables the connection of the power grid to grid-connected renewable resources via the primary converter unit without adversely affecting grid quality.

When regulating the quality of the transmitted power, the auxiliary converter unit employs the energy storage devices of the primary converter unit, which is primarily used for power conversion between the connected AC and DC networks. As such, the sharing of components between the primary and auxiliary converter units allows the footprint of the resulting power electronic converter to be reduced, which leads to savings in terms of size, weight and costs of the associated power station when compared to a conventional power station employing a conventional power electronic converter and a conventional UPQC.

This therefore results in a multifunctional power electronic converter that is capable of regulating the quality of the transmitted power in a connected power grid and is compatible for use with low loss, HVDC power transmission lines, at reduced cost and size of the associated power station.

Preferably the auxiliary switching elements of the or each auxiliary module are controllable in use to inject a voltage into the second transformer winding.

The injection of a voltage into the second transformer winding is performed by controlling the auxiliary switching elements to switch the corresponding energy storage devices into circuit to provide a specific voltage across the second transformer winding. By virtue of being mutually coupled with the second transformer winding, the first transformer winding experiences a corresponding change in voltage, which in turn modifies the power flowing between the power electronic converter and the AC network. This allows the auxiliary converter unit to compensate for power changes in the connected AC network and thereby maintain the stability of the AC network.

Moreover, in the event of a fault or abnormal condition in one of the connected electrical networks, the auxiliary converter unit may be operated to permit repair of the fault or abnormal condition without disconnecting the power electronic converter from the faulty network. This may be done by injecting a specific voltage that, for example, isolates the fault or minimises fault current in the faulty network. Once the fault or abnormal condition has been repaired, normal operation of the power electronic converter can resume without the need for a start-up sequence and series of checks. This minimises the interruption of power flow and non-availability of the power transmission scheme to those dependent on the scheme for electrical power supply.

In embodiments of the invention, the or each auxiliary module may include two pairs of auxiliary switching elements connected in parallel with the respective energy storage device in a full-bridge arrangement to define a 4-quadrant bipolar module that can provide negative, zero or positive voltage and can conduct current in two directions.

The structure of the 4-quadrant bipolar module not only renders the or each auxiliary converter limb compatible for use with the transformer windings associated with alternating current, but also permits the injection of a voltage of either polarity into the second transformer winding.

To define a 4-quadrant bipolar module that can provide negative, zero or positive voltage and can conduct current in two directions, at least one primary module may include two pairs of primary switching elements connected in parallel with the respective energy storage device in a full-bridge arrangement.

To define a 2-quadrant unipolar module that can provide zero or positive voltage and can conduct current in two directions, at least one primary module may include a pair of primary switching elements connected in parallel with the respective energy storage device in a half-bridge arrangement.

The inclusion of such modules results in a modular arrangement of the power electronic converter, which means that it is straightforward to increase or decrease the number of modules in the primary and auxiliary converter units. As such, the primary and auxiliary converter units of the power electronic converter can be easily modified to suit the requirements of the associated power application, such as station footprint size and voltage range. Moreover, the use of such a modular arrangement decreases the complexity of the design, manufacture and assembly of the power electronic converter, which reduces the associated costs and time spent.

In embodiments of the invention, the first limb portion of the or each primary converter limb may further include at least one additional primary module connected in series with the or each primary module of the first limb portion, the energy storage device of the or each additional primary module being connected only to the primary switching elements of the respective additional primary module.

This configuration results in a flexible power electronic converter, whereby the power rating of the primary converter unit is not restricted by the interaction between the primary modules of the first limb portion of the primary converter limb and the auxiliary modules of the auxiliary converter unit, and thereby allows the power electronic converter to accommodate a wider range of power applications.

In other embodiments, the or each primary converter limb may include a plurality of primary modules connected in series to define a chain-link converter, the primary switching elements of the chain-link converter being controllable in use so that the plurality of primary modules connected in series defines a stepped variable voltage source.

In further embodiments, the or each auxiliary converter limb may include a plurality of auxiliary modules connected in series to define an auxiliary chain-link converter, the auxiliary switching elements of the auxiliary chain-link converter being controllable in use so that the plurality of auxiliary modules connected in series defines a stepped variable voltage source.

The structure of the chain-link converter allows the build-up of a combined voltage, which is higher than the voltage provided by an individual module, via the insertion of multiple modules, each providing a voltage, into the chain-link converter. By varying the value of the combined voltage, the chain-link converter may be operated to generate a voltage waveform of variable amplitude and phase angle.

Preferably each energy storage device is or includes a capacitor, a fuel cell, a battery, a photovoltaic cell or an auxiliary AC generator with an associated rectifier.

Each energy storage device may be any device that is capable of storing and releasing its electrical energy to provide a voltage. This flexibility is useful in designing converter stations in different locations where the availability of equipment may vary due to locality or transport difficulties.

In embodiments of the invention, at least one switching element may include at least one semiconductor device. Such a semiconductor device may be an insulated gate bipolar transistor, a gate turn-off thyristor, a field effect transistor, an insulated gate commutated thyristor or an integrated gate commutated thyristor.

In such embodiments employing at least one semiconductor device, at least one switching element may further include an anti-parallel diode connected in parallel with the or each corresponding semiconductor device.

The fast switching capabilities of such semiconductor devices allow the power electronic converter to synthesize complex waveforms for injection into the AC side and/or DC side of the power electronic converter. The injection of such complex waveforms can be used, for example, to minimise the levels of harmonic distortion typically associated with line-commutated thyristor-based power electronic converters.

Furthermore the inclusion of such semiconductor devices allows the auxiliary converter unit to respond quickly to the development of faults and/or other abnormal operating conditions, and thereby improve fault protection of the power electronic converter.

In other embodiments, the or each primary switching element of each primary module may be controllable in use to regulate the voltage of the respective energy storage device.

The regulation of voltage levels provides additional control over the voltage levels of the energy storage device of each primary module. This form of control may be used, for example, to balance the voltage levels of the individual energy storage devices. This is advantageous because it means that the voltage of any particular energy storage device can be kept approximately equal to an average voltage value to simplify the control and improve the performance of the power electronic converter which uses the average voltage value as feedback to control switching of the primary and auxiliary modules.

The first transformer winding of the or each primary converter limb preferably has a higher number of windings than the corresponding second transformer winding.

Preferably each limb portion further includes at least one secondary switching element connected in series with the at least one primary module between the respective DC terminal and the AC terminal, the or each secondary switching element of each limb portion being controllable in use to switch the respective limb portion in and out of circuit between the respective DC terminal and the AC terminal.

The series combination of one or more secondary switching elements and the or each primary module in each limb portion for switching the limb portion in and out of circuit between the respective DC terminal and the AC terminal is advantageous because it reduces the voltage range that the primary module or the set of primary modules of each limb portion would be required to generate. This in turn allows the number of components in each limb portion to be minimized, and thereby reduce the overall size of the primary converter unit.

In further embodiments, the primary and auxiliary converter units may respectively include a plurality of primary converter limbs and a plurality of auxiliary converter limbs, the first transformer winding of each primary converter limb being connected in use to a respective phase of a multi-phase AC network.

In such a power electronic converter, the components of each primary converter limb operates independently of that of the other primary converter limbs and therefore only directly affects the phase connected to the respective AC terminal, and has minimal influence on the phases connected to the AC terminals of the other primary converter limbs. Similarly, the components of each auxiliary converter limb only directly affects the phase associated with the respective second transformer winding and has minimal influence on the phases associated with the other second transformer windings.

BRIEF DESCRIPTION OF THE DRAWINGS

Preferred embodiments of the invention will now be described, by way of non-limiting examples, with reference to the accompanying drawings in which.

DETAILED DESCRIPTION OF EMBODIMENTS OF THE INVENTION

Figure 1:
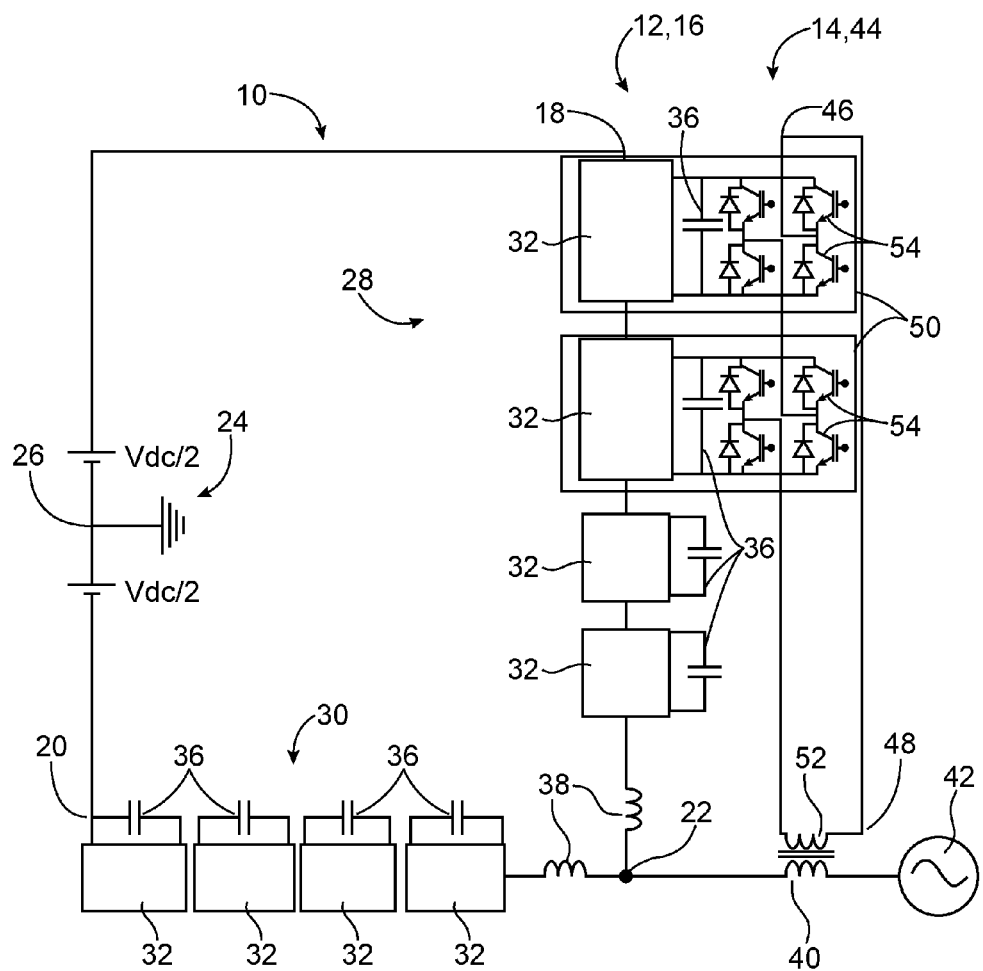
FIG. 1 shows, in schematic form, a single phase power electronic converter according to a first embodiment of the invention.

FIG. 1 shows a power electronic converter 10 according to a first embodiment of the invention.

The power electronic converter 10 comprises a primary converter unit 12 and an auxiliary converter unit 14.

The primary converter unit 12 includes a primary converter limb 16, which includes first and second DC terminals 18,20 and an AC terminal 22.

In use, the first DC terminal 18 is connected to a positive terminal of a DC network 24 carrying a voltage of +Vdc/2, while the second DC terminal 20 is connected to a negative terminal of the DC network 24 carrying a voltage of −Vdc/2. The DC network 24 includes a mid-point connection 26 to ground.

The primary converter limb 16 defines first and second limb portions 28,30. In the primary converter limb 16, the first limb portion 28 includes a plurality of primary modules 32 connected in series between the first DC terminal 18 and the AC terminal 22, while the second limb portion 30 includes a plurality of primary modules 32 connected in series between the second DC terminal 20 and the AC terminal 22.

Figure 2A:
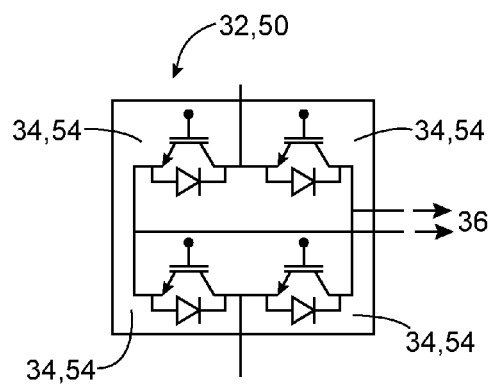
FIGS. 2a and 2b show two arrangements for the primary switching elements of each primary module of the primary converter unit.

Each primary module 32 includes two pairs of primary switching elements 34 connected in parallel with a capacitor 36 in a full-bridge arrangement to define a 4-quadrant bipolar module that can provide negative, zero or positive voltage and can conduct current in two directions, as shown in FIG. 2a.

Each limb portion 28,30 further includes an inductor 38 connected in series with the plurality of primary modules 32. Each inductor 38 of the first and second limb portions 28,30 helps to limit transient current flow between capacitors 36 of the primary modules 32 of the respective limb portion 28,30 and thereby minimise energy losses.

The primary converter unit 12 further includes a first transformer winding 40 connected in series with the AC terminal 22. In use, the first transformer winding 40 is connected between the AC terminal 22 and an AC network 42, which may be, for example, a power grid.

The auxiliary converter unit 14 includes an auxiliary converter limb 44, which includes first and second auxiliary terminals 46,48. In the auxiliary converter limb 44, a plurality of auxiliary modules 50 is connected in series with a second transformer winding 52 between the first and second auxiliary terminals 46,48. The first and second auxiliary terminals 46,48 of the auxiliary converter limb 44 are directly connected to each other to define a closed circuit.

The second transformer winding 52 of the auxiliary converter limb 44 is mutually coupled to the first transformer winding 40 of the primary converter limb 12. The first transformer winding 40 has a lower number of windings than the second transformer winding 52. In other embodiments, it is envisaged that the ratio of windings in the first and second transformer windings 40,52 may vary depending on power requirements of the power electronic converter 10 and associated power networks 24,42.

Each auxiliary module 50 includes two pairs of auxiliary switching elements 54 connected in parallel with the capacitor 36 of the respective primary module of the first limb portion of the primary converter limb in a full-bridge arrangement to define a 4-quadrant bipolar module that can provide negative, zero or positive voltage and can conduct current in two directions, as shown in FIG. 2A.

As shown in FIG. 1, the sharing of capacitors 36 is achieved between the auxiliary modules 50 of the auxiliary converter limb 44 and only some of the primary modules 32 of the first limb portion 28 of the primary converter limb 16. It is envisaged that, in other embodiments, the number of primary modules 32 of the first limb portion 28 of the primary converter limb 16 may be equal to the number of auxiliary modules 50 of the auxiliary converter limb 44, such that each primary module 32 of the first limb portion 28 of the primary converter limb 16 shares a capacitor 36 with the respective auxiliary module 50 of the auxiliary converter limb 44. The number of primary and auxiliary modules 32,50 in the respective converter limb 16,44 may vary depending on the required voltage rating of the respective converter limb 16,44 and the power requirements of the connected DC and AC networks 24,42.

Each set of series-connected primary modules 32 in each limb portion 28,30 of the primary converter limb 16 defines a primary chain-link converter. Similarly, the set of series-connected auxiliary modules 50 of the auxiliary converter limb 44 defines an auxiliary chain-link converter.

The switching elements 34,54 of the modules 32,50 of the primary and auxiliary chain-link converters are operable in use so that each chain-link converter provides a stepped variable voltage source, and may be switched at near to the fundamental frequency of the AC network.

The capacitor 36 of each module 32,50 may be bypassed or inserted into the respective chain-link converter by changing the state of the switching elements 34,54 of the module 32,50.

The capacitor 36 of each module 32,50 is bypassed when the pairs of switching elements 34,54 are configured to form a short circuit in the module 32,50, causing the current in the respective converter unit 12,14 to pass through the short circuit and bypass the capacitor 36. This enables the module 32,50 to provide a zero voltage.

The capacitor 36 of each module 32,50 is inserted into the respective chain-link converter when the pairs of switching elements 34,54 are configured to allow the current in the respective converter unit 12,14 to flow into and out of the capacitor 36, which is then able to charge or to discharge its stored energy and provide a voltage. The bidirectional nature of the 4-quadrant bipolar module means that the capacitor 36 may be inserted into the module 32,50 in either forward or reverse directions so as to provide a positive or negative voltage.

It is therefore possible to build up a combined voltage across the respective chain-link converter which is higher than the voltage available from each individual module 32,50 via the insertion of the capacitors 36 of multiple modules 32,50, each providing its own voltage, into the respective chain-link converter.

The ability of a 4-quadrant bipolar module to provide positive or negative voltages means that the voltage across each chain-link converter may be built up from a combination of modules 32,50 providing positive or negative voltages. The energy levels in individual capacitors 36 may be maintained therefore at optimal levels by controlling the primary modules 32 of each limb portion 28,30 of the primary converter limb 16 to alternate between providing positive or negative voltage.

Figure 2B:
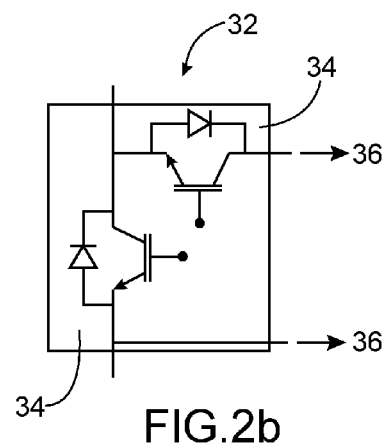

In other embodiments, it is envisaged each primary module 32 of each limb portion 28,30 may include a pair of primary switching elements 34 connected in parallel with a capacitor 36 in a half-bridge arrangement to define a 2-quadrant unipolar module that can provide zero or positive voltage and can conduct current in two directions, as shown in FIG. 2b.

Figure 3:
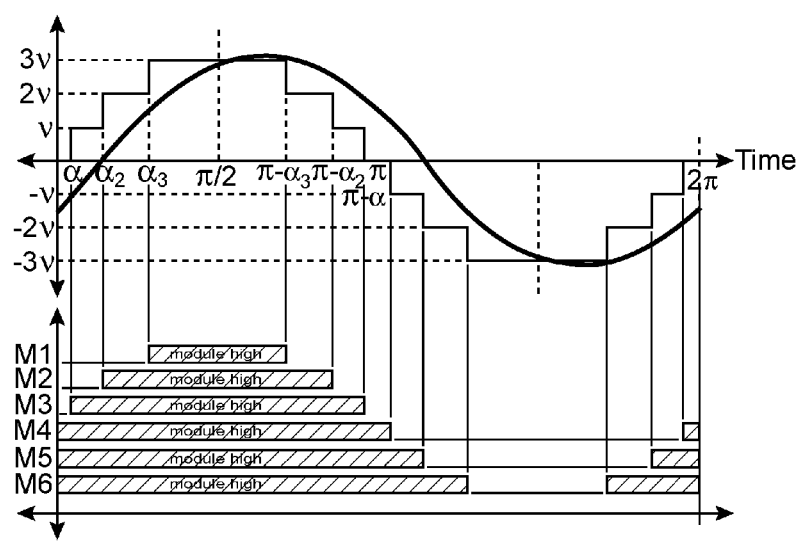
FIG. 3 shows the synthesis of a 50 Hz sinusoidal waveform using a chain-link converter shown in FIG. 1.

It is also possible to vary the timing of switching operations for each module 32,50 such that the insertion and/or bypass of the capacitors 36 of individual modules 32,50 in the respective chain-link converter results in the generation of a voltage waveform. An example of a voltage waveform generated using the chain-link converters in FIG. 1 is shown in FIG. 3, in which the insertion of the capacitors 36 of the individual modules 32,50 is staggered to generate a 50 Hz sinusoidal waveform. Other waveform shapes may be generated by adjusting the timing of switching operations for each module 32,50 in the respective chain-link converter.

Each chain-link converter is suitable for use in step-wise waveform generation due to its ability to provide voltage steps to increase or decrease the output voltage. The step-wise approximation of the generated voltage waveform may be improved by using a higher number of modules 32,50 with lower voltage levels to increase the number of voltage steps.

In FIGS. 2a and 2b, each switching element 34,54 is an insulated gate bipolar transistor connected in parallel with an anti-parallel diode. In other embodiments, each switching element 34,54 may include a different semiconductor device, such as a gate turn-off thyristor, a field effect transistor, an insulated gate commutated thyristor, an integrated gate commutated thyristor or other force-commutated or self-commutated semiconductor switches, preferably connected in parallel with an anti-parallel diode.

The capacitor 36 may be replaced by another type of energy storage device, which may be or include, for example, a fuel cell, a battery, a photovoltaic cell or an auxiliary AC generator with an associated rectifier.

Figure 4:
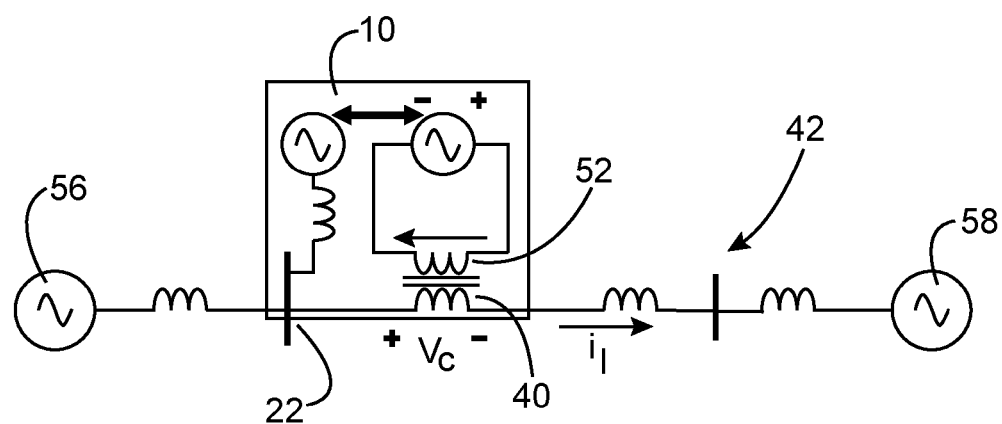
FIG. 4 shows, in schematic form, a configuration of the connection between the power electronic converter and an AC network.

FIG. 4 shows an example of a configuration of the power electronic converter 10 and the AC network 42. In use, the AC terminal 22 of the power electronic converter 10 is connected to a first power source 56 of the AC network 42 while the first transformer winding 40 is connected between the AC terminal 22 and a second power source 58. It is envisaged that, in other configurations, the first power source 56 may be either removed or replaced by a load.

The operation of the power electronic converter 10 of FIG. 1 is described with reference to FIGS. 2a, 2b and 4 as follows.

During normal operating conditions, the primary converter unit 10 of FIG. 1 is operated to perform power conversion between the AC network 42 and the DC network (not shown in FIG. 4). In use, the chain-link converters of the first and second limb portions 28,30 of the primary converter limb 16 are controlled to vary their respective voltages to offset the voltage at the respective DC terminal 18,20 so as to synthesize positive or negative half-sine waves at the AC terminal 22. As such, the chain-link converters of the first and second limb portions 28,30 are therefore operable to generate a voltage waveform at the AC terminal 22 to facilitate power conversion between the DC and AC networks 24,42.

During this stage, the auxiliary switching elements 54 of each auxiliary module 50 are controlled in use to permit the circulation of current through the auxiliary converter unit 14 as a result of the second transformer winding 52 being mutually coupled with the current-carrying first transformer winding 40.

In the event of an abnormal condition either in the power electronic converter 10 or the connected DC and AC networks 24,42, the auxiliary switching elements 54 of the auxiliary modules 50 of the auxiliary converter unit 14 are controllable in use to inject a voltage into the second transformer winding 52.

Examples of an abnormal condition include grid contingencies such as a tripping line or generator, voltage dips and short circuits leading to high fault current.

The injection of a voltage into the second transformer winding 52 is performed by controlling the auxiliary switching elements 54 of the auxiliary modules 50 to switch the corresponding capacitors 36 into circuit to provide a specific voltage across the second transformer winding 52. By virtue of being mutually coupled with the second transformer winding 52, the first transformer winding 40 experiences a corresponding change in voltage, which in turn modifies the power flowing between the power electronic converter 10 and the AC network 42.

In use, the auxiliary modules 50 of the auxiliary converter unit 14 are controlled to inject a voltage into the second transformer winding 52 so as to result in a voltage across the first transformer winding 40, Vc, having a specific amplitude and phase. The voltage Vc can be expressed as a function of the line current, $i_1$, that flows through the first transformer winding 40, as shown in Equation 1.

$$V_C = \pm jkX_{eq}i_1 \quad (1)$$

Where Vc is the compensation voltage injected into the first transformer winding 40;

$i_1$ is the line current flowing through the first transformer winding 40;

$X_{eq}$ is the series equivalent line impedance; and k is the degree of compensation.

The voltage injection capability of the auxiliary converter unit 14 permits the modification of the power flowing between the power electronic converter 10 and the AC network 42 in different ways.

One way of power modification using this voltage injection capability is dynamic voltage restoration, whereby the auxiliary converter unit 14 is controlled in use to inject a specific voltage into the second transformer winding 52 so as to compensate for any dip in voltage of the AC network 42. The ability to ride through voltage dips at the distribution level of a power network is critical in maintaining grid stability.

This capability also enables the power electronic converter 10 to exert control over the power flow in the power electronic converter 10 and the AC network 42 by, for example, controlling both active and reactive powers to limit fault current at the AC network 42, mitigating power sub-synchronous oscillations, or providing ride-through capability in relation to voltage dips.

Furthermore, the voltage injection capability of the auxiliary converter unit 14 provides the power electronic converter 10 with the ability to carry out isolation or ride-through of DC faults.

For example, in FIG. 1, when a short circuit occurs between the mid-point connection 26 of the DC network 24 and the AC terminal 22, the auxiliary converter unit 14 is controlled to inject a voltage into the second transformer winding 52 so that an appropriate voltage appears across the first transformer winding 40, which opposes the voltage from the AC network 42 and thereby minimises fault current.

This not only prevents damage to the power electronic converter 10 and AC network components, but also permits repair to be carried out on the power electronic converter 10 without disconnecting the power electronic converter 10 from the AC network 42. Once the short circuit has been removed, normal operation of the power electronic converter 42 can resume without the need for a start-up sequence and series of checks. This minimises the interruption of power flow and non-availability of the power transmission scheme to those dependent on the scheme for electrical power supply.

Omitting the auxiliary converter unit 14 from the power electronic converter 10 would necessitate the disconnection of the power electronic converter 10 from the AC network 42 in order to prevent damage to the power electronic converter 10 and the AC network components.

The inclusion of the primary and auxiliary converter units 12,14 in the power electronic converter 10 therefore results in an arrangement that is not only capable of performing power conversion between the DC and AC networks 24,42 to enable connection to low loss, HVDC power transmission lines, but also provides multi-functional control, which is similar to that of a UPQC, over the power flow in the connected AC network 42 to ensure stability in the AC network 42.

The multi-functional control capability of the power electronic converter 10 is further enhanced by the earlier described ability of the auxiliary chain-link converters to generate high quality voltage waveforms. This further improves the quality of the power flowing in the AC network 42 and thereby enhances the stability and reliability of the AC network 42.

Furthermore, the sharing of capacitors 36 between the primary and auxiliary converter units 14,16 allows the footprint of the resulting power electronic converter 10 to be reduced, which leads to savings in terms of size, weight and costs of the associated power station when compared to a conventional power station employing a conventional power electronic converter and a conventional UPQC.

Figure 5:
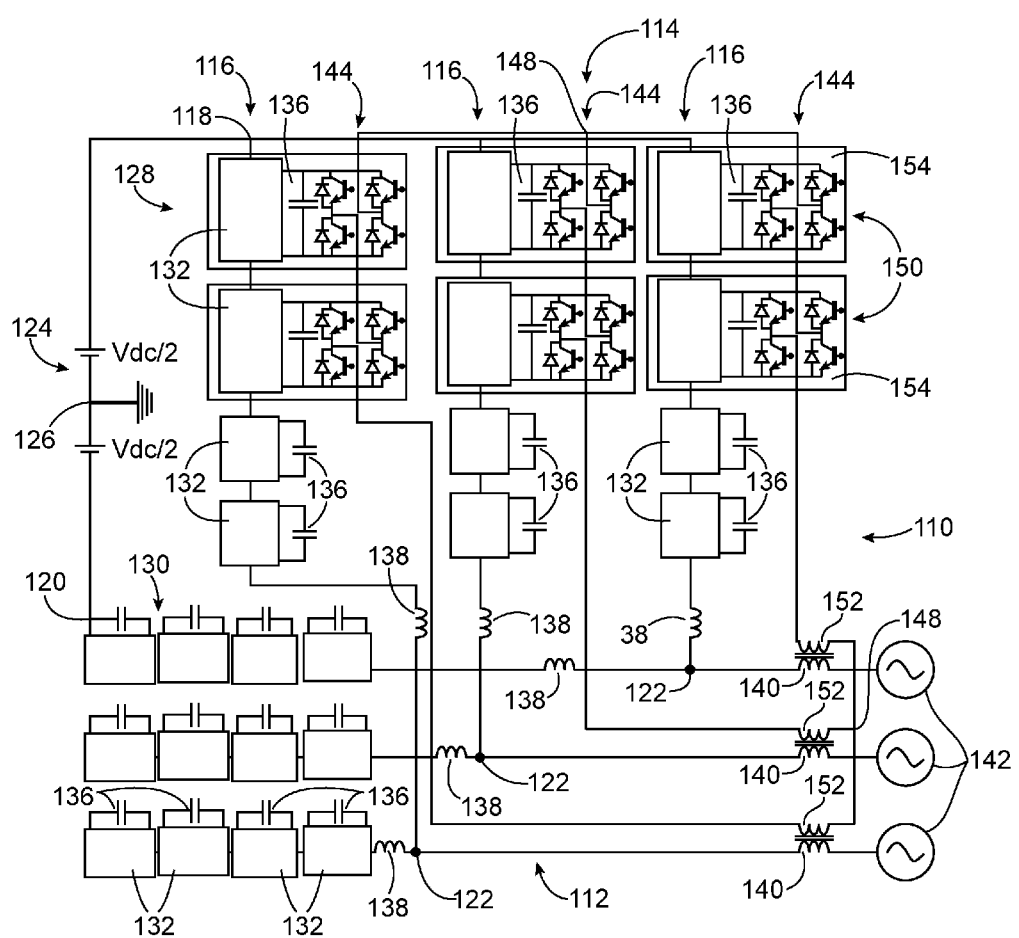
FIG. 5 shows, in schematic form, a three-phase power electronic converter according to a second embodiment of the invention.

FIG. 5 shows a power electronic converter 110 according to a second embodiment of the invention. The primary converter unit 112 includes three primary converter limbs 116, while the auxiliary converter unit 114 includes three auxiliary converter limbs 144. Each of the primary and auxiliary converter limbs 116,144 in FIG. 5 is respectively similar in structure and operation to the primary and auxiliary converter limbs 16,44 of FIG. 1 except that the auxiliary converter limbs 144 are connected in parallel with each other and that, in use, the AC terminal 122 of each primary converter limb 116 is connected to a respective phase of a three-phase AC network 142.

In the three-phase power electronic converter 110, the components of each primary converter limb 116 operates independently of that of the other primary converter limbs 116 and therefore only directly affects the phase connected to the respective AC terminal 122, and has minimal influence on the phases connected to the AC terminals 122 of the other primary converter limbs 116. Similarly, the components of each auxiliary converter limb 144 only directly affects the phase associated with the respective second transformer winding 152 and has minimal influence on the phases associated with the other second transformer windings 152.

It is envisaged that, in other embodiments, the primary and auxiliary converter units may respectively include any number of primary and auxiliary converter limbs, the first transformer winding of each primary converter limb being connected in use to a respective phase of a multi-phase AC network.

A power electronic converter according to a third embodiment of the invention is similar in structure and operation to the power electronic converter 10 of FIG. 1, except that each limb portion further includes a secondary switching element connected in series with the primary modules between the respective DC terminal and the AC terminal.

It is envisaged that, in other embodiments, the number of series-connected secondary switching elements in each limb portion may increase depending on the required voltage rating of each limb portion.

In use, the secondary switching element of each limb portion is operated to switch the respective limb portion in and out of circuit during power conversion between the AC and DC networks. This is advantageous because it reduces the voltage range that the chain-link converter of each limb portion would be required to generate. This in turn allows the number of components in each limb portion to be minimized, and thereby reduce the overall size of the primary converter unit.

In a fourth embodiment of the invention, the three-phase power electronic converter 110 of FIG. 4 may be modified in a similar manner so that each limb portion of each primary converter limb includes one or more secondary switching elements connected in series with the primary modules between the respective DC terminal and the AC terminal.

The invention claimed is:

1. A power electronic converter for high/medium voltage direct current power transmission and reactive power compensation comprising a primary converter unit and an auxiliary converter unit, the primary converter unit including at least one primary converter limb including first and second DC terminals for connection in use to a DC network and an AC terminal, the or each primary converter limb defining first and second limb portions, each limb portion including at least one primary module connected in series between a respective one of the first and second DC terminals and the AC terminal, the or each primary module including at least one primary switching element connected to an energy storage device, the or each primary converter limb further including a first transformer winding connected in series with the respective AC terminal for connection in use between the respective AC terminal and an AC network; the auxiliary converter unit including at least one auxiliary converter limb including first and second auxiliary terminals, the or each auxiliary converter limb further including at least one auxiliary module connected in series with a second transformer winding between the first and second auxiliary terminals, the or each auxiliary module including a plurality of auxiliary switching elements connected to the energy storage device of a corresponding primary module in the first limb portion of a respective primary converter limb, the second transformer winding of the or each auxiliary converter limb being mutually coupled with the first transformer winding of the respective primary converter limb, the primary switching elements of the primary modules being controllable in use to switch the respective energy storage device in and out of circuit to generate a voltage waveform at the respective AC terminal.

2. A power electronic converter according to claim 1 wherein the auxiliary switching elements of the or each auxiliary module are controllable in use to inject a voltage into the second transformer winding.

3. A power electronic converter according to claim 1 wherein the or each auxiliary module includes two pairs of auxiliary switching elements connected in parallel with the respective energy storage device in a full-bridge arrangement to define a 4-quadrant bipolar module that can provide negative, zero or positive voltage and can conduct current in two directions.

4. A power electronic converter according to claim 1 wherein at least one primary module includes two pairs of primary switching elements connected in parallel with the respective energy storage device in a full-bridge arrangement to define a 4-quadrant bipolar module that can provide negative, zero or positive voltage and can conduct current in two directions.

5. A power electronic converter according to claim 1 wherein at least one primary module includes a pair of primary switching elements connected in parallel with the respective energy storage device in a half-bridge arrangement to define a 2-quadrant unipolar module that can provide zero or positive voltage and can conduct current in two directions.

6. A power electronic converter according to claim 1 wherein the first limb portion of the or each primary converter limb further includes at least one additional primary module connected in series with the or each primary module of the first limb portion, the energy storage device of the or each additional primary module being connected only to the or each primary switching element of the respective additional primary module.

7. A power electronic converter according to claim 1 wherein the or each primary converter limb includes a plurality of primary modules connected in series to define a primary chain-link converter, the primary switching elements of the primary chain-link converter being controllable in use so that the plurality of primary modules connected in series defines a stepped variable voltage source.

8. A power electronic converter according to claim 1 wherein the or each auxiliary converter limb includes a plurality of auxiliary modules connected in series to define an auxiliary chain-link converter, the auxiliary switching elements of the auxiliary chain-link converter being controllable in use so that the plurality of auxiliary modules connected in series defines a stepped variable voltage source.

9. A power electronic converter according to claim 1 wherein each energy storage device is or includes a capacitor, a fuel cell, a battery or an auxiliary AC generator with an associated rectifier.

10. A power electronic converter according to claim 1 wherein at least one switching element includes at least one semiconductor device.

11. A power electronic converter according to claim 10 wherein the or each semiconductor device is an insulated gate bipolar transistor, a gate turn-off thyristor, a field effect transistor, an insulated gate commutated thyristor or an integrated gate commutated thyristor.

12. A power electronic converter according to claim 10 wherein at least one switching element further includes an anti-parallel diode connected in parallel with the or each corresponding semiconductor device.

13. A power electronic converter according to claim 1 wherein the or each primary switching element of each primary module is controllable in use to regulate the voltage of the respective energy storage device.

14. A power electronic converter according to claim 1 wherein the first transformer winding of the or each primary converter limb has a higher number of windings than the corresponding second transformer winding.

15. A power electronic converter according to claim 1 wherein each limb portion further includes at least one secondary switching element connected in series with the at least one primary module between the respective DC terminal and the AC terminal, the or each secondary switching element of each limb portion being controllable in use to switch the respective limb portion in and out of circuit between the respective DC terminal and the AC terminal.

16. A power electronic converter according to claim 1 wherein the primary and auxiliary converter units respectively include a plurality of primary converter limbs and a plurality of auxiliary converter limbs, the first transformer winding of each primary converter limb being connected in use to a respective phase of a multi-phase AC network.

17. A power electronic converter according to claim 11 wherein at least one switching element further includes an anti-parallel diode connected in parallel with the or each corresponding semiconductor device.

* * * * *